(12) United States Patent
Moser

(10) Patent No.: US 7,509,584 B2
(45) Date of Patent: Mar. 24, 2009

(54) DYNAMIC ECMASCRIPT CLASS LOADING

(75) Inventor: Martin Moser, Speyer (DE)

(73) Assignee: SAP AG, Walldorf (DE)

( * ) Notice: Subject to any disclaimer, the term of this patent is extended or adjusted under 35 U.S.C. 154(b) by 656 days.

(21) Appl. No.: 10/856,689

(22) Filed: May 28, 2004

(65) Prior Publication Data

US 2005/0268243 A1     Dec. 1, 2005

(51) Int. Cl.
  *G06F 3/00*   (2006.01)
  *G06Q 30/00*  (2006.01)
  *G07G 1/14*   (2006.01)
  *G06G 7/48*   (2006.01)
(52) U.S. Cl. .............................. 715/760; 705/14; 704/3
(58) Field of Classification Search ................ 715/513; 705/14; 704/3
  See application file for complete search history.

(56) References Cited

U.S. PATENT DOCUMENTS

| | | | | |
|---|---|---|---|---|
| 5,890,171 | A * | 3/1999 | Blumer et al. | 715/501.1 |
| 5,973,696 | A * | 10/1999 | Agranat et al. | 715/760 |
| 6,185,555 | B1 * | 2/2001 | Sprenger et al. | 707/3 |
| 6,209,036 | B1 * | 3/2001 | Aldred et al. | 709/229 |
| 6,327,574 | B1 * | 12/2001 | Kramer et al. | 705/14 |
| 6,456,308 | B1 * | 9/2002 | Agranat et al. | 715/854 |
| 6,460,071 | B1 * | 10/2002 | Hoffman | 709/203 |
| 6,732,117 | B1 * | 5/2004 | Chilton | 707/103 X |
| 2005/0010454 | A1 * | 1/2005 | Falk et al. | 705/4 |

OTHER PUBLICATIONS

Loban, Scott; "Coding Guidelines for Client-Side Scripting"; http://www.peachpit.com/articles/article.asp?p=24273&rl=1; Nov. 30, 2001.*
Griffiths, Greg. "Using Client Side Includes instead of Server Side Includes"; http://builder.com.com/5100-6371-5172019.html; Mar. 25, 2004.*
"ECMAScript"; http://en.wikipedia.org/wiki/ECMA-Script; Jul. 31, 2004.*
Allen, Susan, "What is Registry?"; http://registry-repair-software-review.toptenreviews.com/what-is-the-registry.html; Aug. 14, 2004.*

* cited by examiner

*Primary Examiner*—Doug Hutton
*Assistant Examiner*—Soumya Dasgupta
(74) *Attorney, Agent, or Firm*—Mintz, Levin, Cohn, Ferris, Glovsky and Popeo P.C.

(57) ABSTRACT

A system and method for building a client application in a client-server network are disclosed. One system includes an HTML file that is requested from a server. An infrastructure script file is requested from the server based on a reference in the header section of the HTML file, and an infrastructure class instance is created. In the body section of the HTML file, the infrastructure class instance creates component instances based on one or more calls in the HTML file. To create the component instances, the infrastructure class instance first loads the component class script files from the server, and creates and links the component classes based on the component class scripts. Component instances are then created based on the linked component classes to thereby form the application.

15 Claims, 7 Drawing Sheets

DYNAMIC ECMASCRIPT CLASS LOADING

BACKGROUND

ECMAScript is a standard script language derived largely from JavaScript, and is now widely used. A script is a program or sequence of instructions that is interpreted or executed by another program, as opposed to being compiled and executed directly by a computer processor. ECMAScript derives its name from the European Computer Manufacturer's Association, under whose auspices it was originally developed, and is used to affect how a Web application looks and behaves.

Current ECMAScript is a Java-like scripting language that contains rudimentary elements of object-oriented programming. ECMAScript is run as soon as it is loaded into a browser. If a script is not well-organized and refers to undefined symbols, however, a runtime error will result.

Current ECMAScript provides so-called "objects" and "prototypes." Objects are the basic building blocks handled by programs written in ECMAScript, similar to objects in other object-oriented languages such as Java or Smalltalk. Prototypes are objects that can be used as blueprints for other objects. (In contrast to other object-oriented languages, where new objects are created by instantiating a class, in ECMAScript, new objects are generally created by cloning prototypes.) Objects are a collection of "properties." A property has a name and a value. Property names are strings. Property values can be scalar values such as integers, floats, strings, arrays, objects, and functions. Function-valued properties have executable code as their value. Creating a new object not based on a prototype results in an object without any properties.

In an example, assume having an object O with a property p. The syntax for retrieving the value of property p is O.p. If O does not have a property with name p, the result of expression O.p is undefined. If the value of property p is a function, accessing the value of property p yields the function definition, which is a string. The syntax to execute the function definition stored in the value of property p is O.p(<parameters>), where <parameters> is a list of scalar values, arrays or objects, separated by commas. To add a new property q to an object O, assign a value to O.q. For example, assume an object O which does not have a property q. The statement O.q="test" first adds the property q to object O, then assigns the value "test" to q. (If O already had a property q, no new property is added; only the value "test" is assigned to O.q.)

Prototypes are objects that can be used as blueprints for other objects. An object with name name can serve as a prototype, if it satisfies the following conditions:

There is a constructor method Name(<parameters>).
All properties p of the prototype are assigned to name.prototype.p, rather than to name.p.

Then, it is possible to create objects based on the prototype object name by executing the code new Name(<parameters>).

When an object is created based on a prototype, a so-called dependent object is created. The dependent object initially has none of its own properties, but has a link to the prototype, called the prototype link. Via the prototype link, the dependent object inherits all properties from the prototype.

It is possible to add properties to the dependent object. Adding a property to a dependent object with a name different from the names of properties already defined at the prototype is called "extending the prototype". In contrast, adding a property that has the same name as some other property already defined at the prototype is called "overwriting the property".

Assume a prototype object P with properties p and q. Further, assume a dependent object O with a properties q and r. Property r of object O extends P, while property q of O overwrites property q of P.

An effect of the prototype link is that the semantics of property access change under certain circumstances: As usual, O.r yields the value of O.r. Also, O.q yields the value of O.q. However, rather than returning undefined, O.p results in the value of P.p: As property p is undefined at O, the property evaluation mechanism follows the prototype link to P and returns the results of the property evaluation at P.

A further effect of the prototype link is that changes to the prototype also affect all dependent objects. In more detail:

Changing the value of a property at the prototype will affect all dependent objects that have not overwritten the property.

Adding properties to, or removing properties from, the prototype affects all dependent objects that have not overwritten the property.

Although the prototype mechanism provides basic functionality for object-oriented programming, current ECMAScript does not provide a mechanism for linking class objects once they are created and/or loaded into a hypertext markup language (HTML) page.

SUMMARY

This document discloses a computer-implemented mechanism that dynamically loads ECMAScript files, determines when all relevant ECMAScript files have been loaded, and dynamically links ECMAScript classes. Accordingly, a script framework is provided in which scripts can be componentized, and that assures that all component scripts are loaded before script component execution begins. The disclosed mechanism provides "on demand" file loading and linking.

In one implementation, a system for developing a client application in a client-server network is described. The system includes a structured code set defining a web page in a browser. In this implementation, a web page includes a set of component instances. The system further includes an infrastructure script that, when called by the web page, automatically loads the component class scripts from the server, which are required to create the component instances. The infrastructure class then links the component class scripts at the client, creates a component instance for each component on the Web page, and assembles the Web page from the component instances.

Another implementation that is disclosed is a method for developing a client application in a client-server network. One method includes the steps of requesting an HTML page from a server, and requesting an infrastructure script from the server based on a reference in the HTML page. The method further includes creating an infrastructure class instance. The infrastructure class instance requests application component class scripts from the server based on one or more calls in the HTML page, links the component class scripts, and create component instances based on linked component class scripts. Accordingly, ECMAScript classes can be dynamically loaded, created and linked in an application.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to dynamic ECMAScript class loading, for the loading, linking and executing of class objects for a component-based client application in a client-server network.

Figure 1:
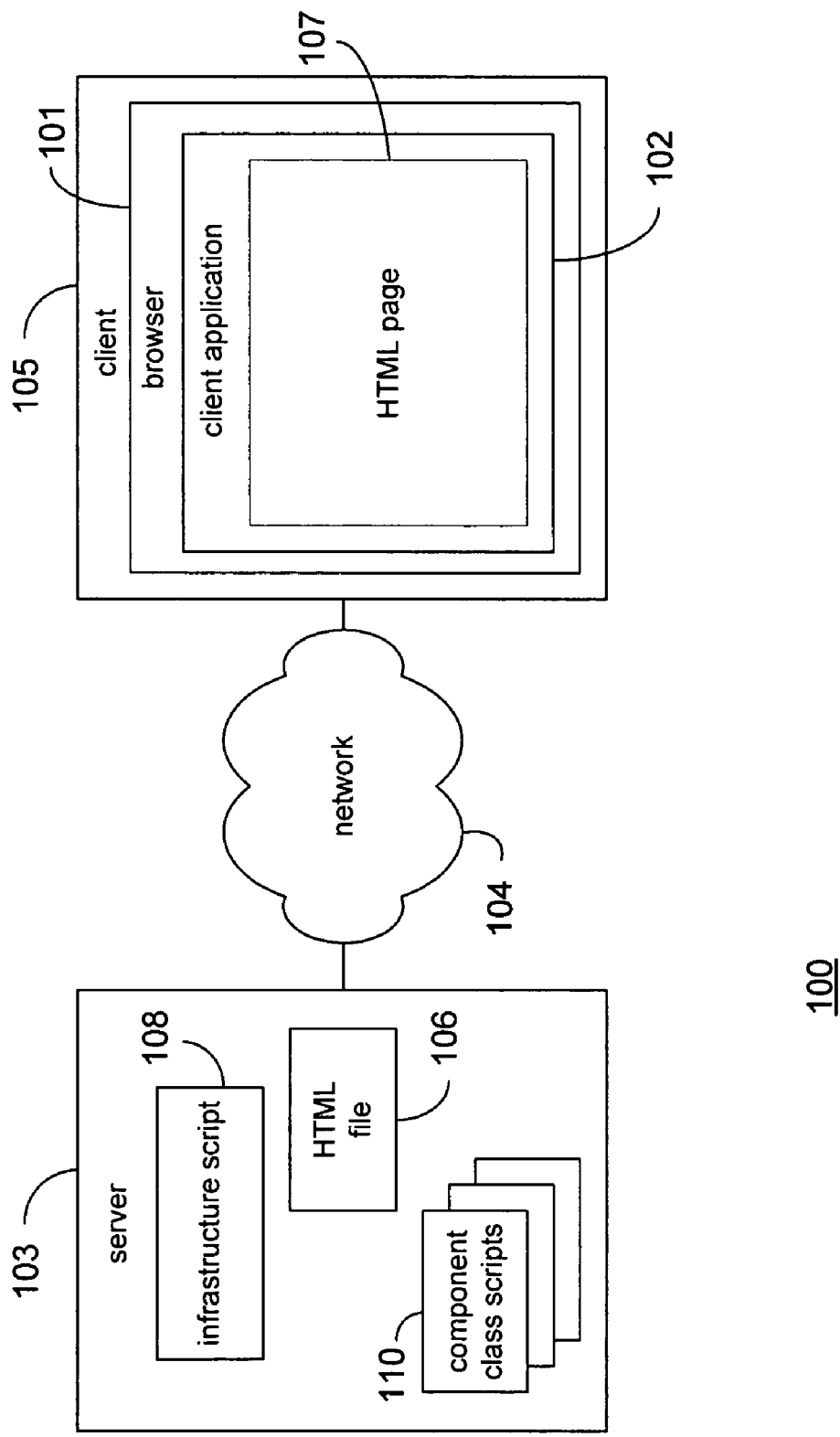
FIG. 1 is a block diagram of a system for building a client application in a client-server network.

FIG. 1 is a block diagram of a system 100 for building a client application 102 in a client-server network. The system 100 includes at least one server 103 and at least one client 105 connected together in or by a network 104. The client application 102 is formed of a structured code set file 106 and an infrastructure script file 108 received from a server 103, and one or more component class files 110 either received from the server 103 or generated by an infrastructure class instance 107 in the client 105. The infrastructure script file 108 and the component class files 110 are preferably ECMAScript-compliant script files, however other object-oriented script languages may be used. The structured code set file 106 is preferably an HTML file, as referenced to hereafter, but may also be another type of structured code. At runtime, the HTML file 106, the infrastructure script file 108, and the one or more component class files 110 are assembled within browser 101 and executed. As a result, an HTML page 107 including one or more component class instances 111 is created.

Figure 2A:
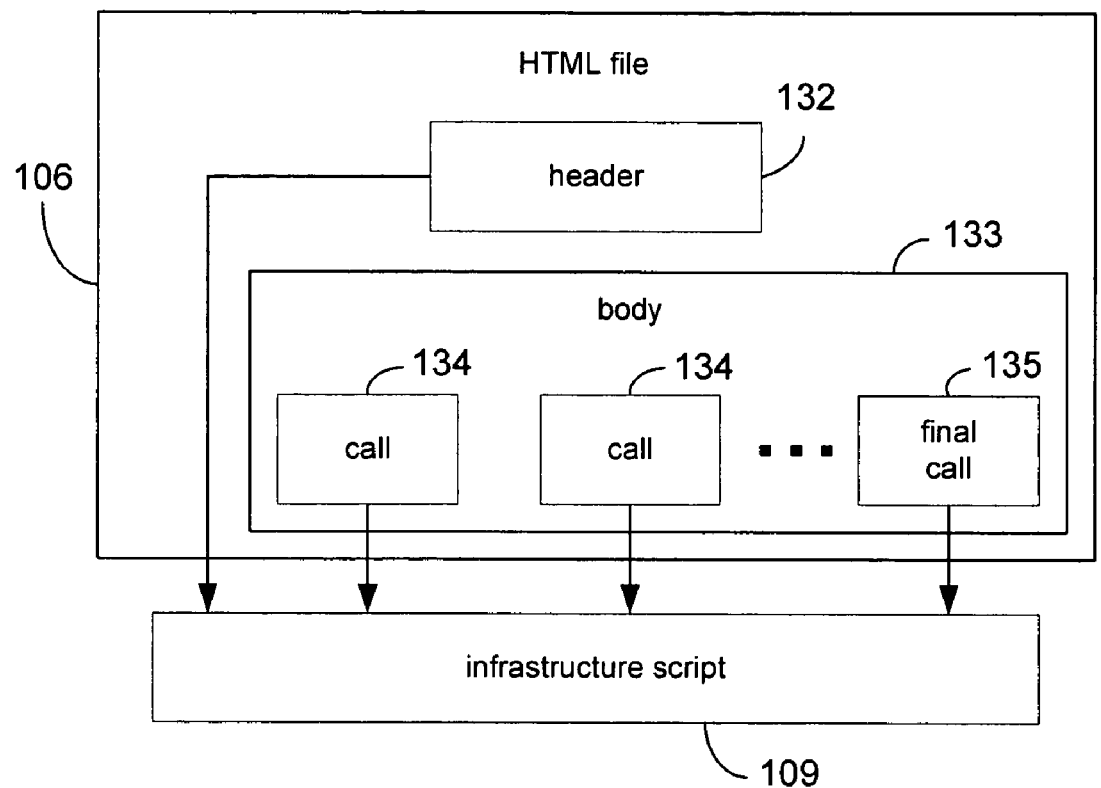
FIG. 2(a) is a block diagram of a static environment of a browser-based application.
Figure 2B:
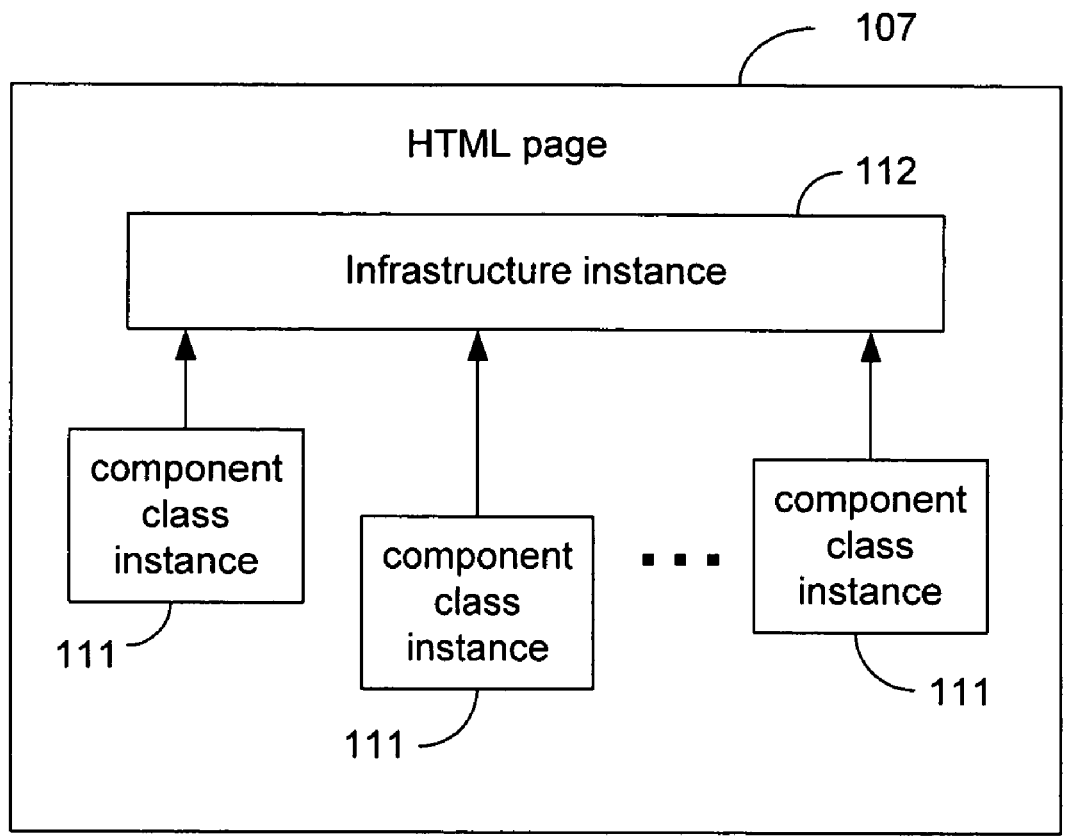
FIG. 2(b) is a block diagram of a runtime environment of a browser-based application.

The HTML file 106 is the starting point of the application 102. The HTML file 106 provides the component infrastructure, via the infrastructure script 108 and the component class scripts 110 that will be instantiated in the application 102. Accordingly, in the static environment as shown in FIG. 2(a), the HTML file 106 includes a header 132 and a body 133. The header 132 includes a reference to the infrastructure class file. FIG. 2(b) shows the runtime environment for the application. The HTML page 107 includes an infrastructure instance 112, which is called by each component class instance 111. Accordingly, the body 133 includes code to create the infrastructure class instance 112, a call 134 to the infrastructure class instance 109 to create each component class instance 111, and a final call 135 to the infrastructure class instance to start the browser-based application.

In one example, the header 132 of the HTML file 107 includes a static reference to the infrastructure script 109 infrastructure.js. The infrastructure script 109 defines functions required to load the component class scripts, link them, create component class instances, and execute the application. When a component class instance is created, a unique instance identifier and the name of the component class script 110 are passed as parameters. The HTML file 107 further includes one final call 135 to the infrastructure script 109 instance at the end of the page to signal that all components 111 have been created.

The following is an example HTML file SamplePage.html for a simple application:

```
<!---------------------------------------------------->
<! -- SamplePage.html: Sample application creating one -->
<! -- instance of class 'SampleClass'. -->
<!---------------------------------------------------->
    <html>
        <head>
            <! -- static infrastructure script -->
            <script src='infrastructure.js'></script>
        </head>
        <body>
            <! -- create the sample component instance -->
            <script>
                infrastructure.createInstance ('sampleId',
                    'SampleClass');
            </script>
            <! -- run the application -->
            <script>
                Infrastructure.run ( );
            </script>
        </body>
    </html>
<! -- End of page ---------------------------------------->
```

Figure 3:
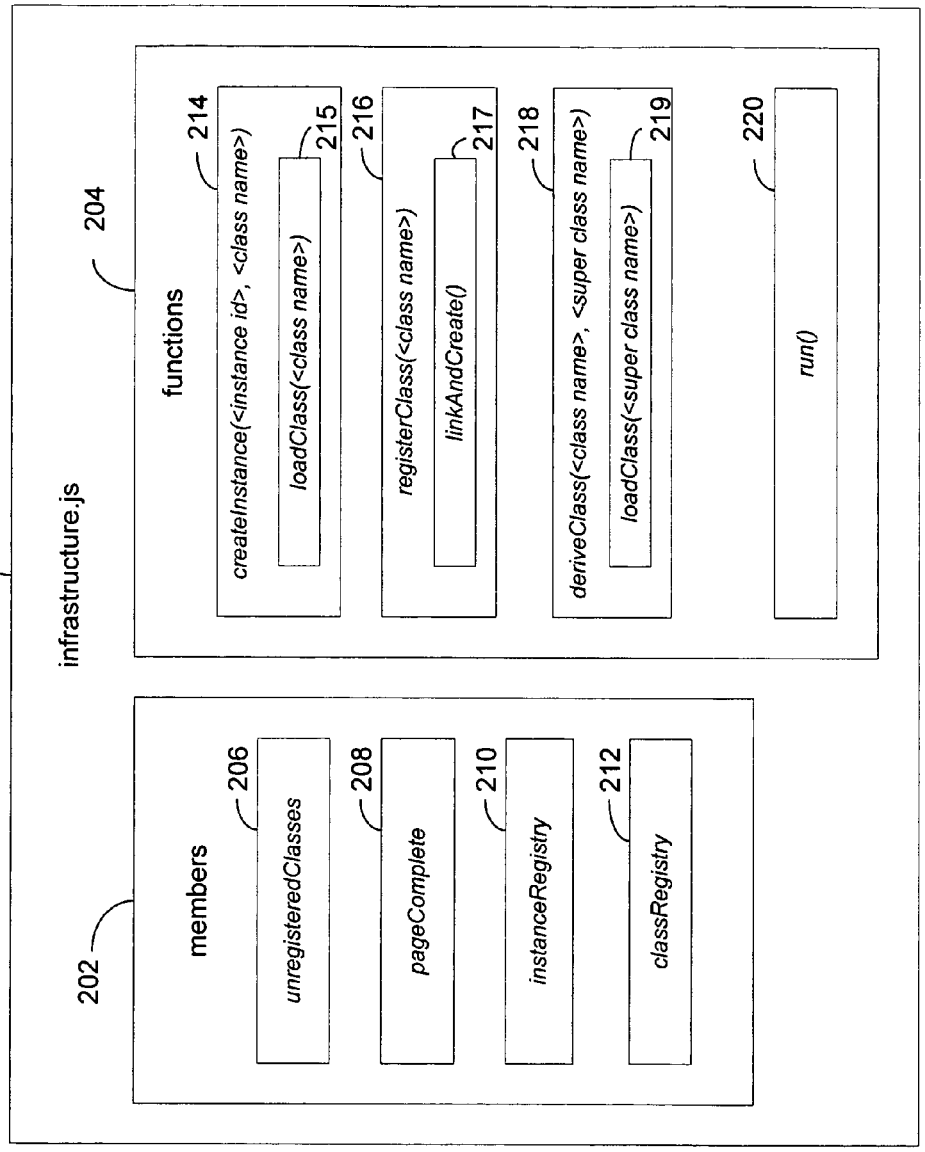
FIG. 3 is a block diagram of an infrastructure class instance.

The infrastructure script class 107 provides the infrastructure to assemble a browser-based application 102. Accordingly, the infrastructure script class 107 provides the mechanism to load the required component classes, link them, and create the component instances. As shown in FIG. 3, the infrastructure script 104 defines a group of members 202: an unregistered classes member (unregisteredClasses 206); a page complete member (pageComplete 208); an instance registry member (instanceRegistry 210); and a class registry member (classRegistry 212). Further, the infrastructure defines a group of functions 204: a create instance function (createInstance(<instance id>, <class name>) 214); a register class function (registerClass(<class name>) 216); a derive class function (deriveClass(<class name>, <super class name>) 218) and a run function (run( )220).

The names shown for each member 202 and function 204 may be chosen in a way that the sequence of calls in the HTML page 107 feels "natural" for a developer who codes browser-based applications. Consequently, however, the members 202 and functions 204 described below can behave differently from what their name suggests, and are not intended to be so limited.

The purpose of the infrastructure script members 202 are as follows. The member unregisteredClasses 206 is a counter that is initially zero. It counts the classes for which class loading was triggered, but which have not already registered. The member pageComplete 208 includes a boolean flag that is initially false. It is set to true by the call to the function run 220 at the end of the HTML page 107, after all component instances 111 have been created.

The member instanceRegistry 210 is initially a new object. In one example, for each call to the function createInstance (<instance id>, <class name>) 214, the instanceRegistry 210 object has one property, named instance id, and the value of the property is class name. The instance identifier need not be passed, however. In an alternative implementation, a unique identifier can be generated in createInstance by, for example, counting.

Figure 4:
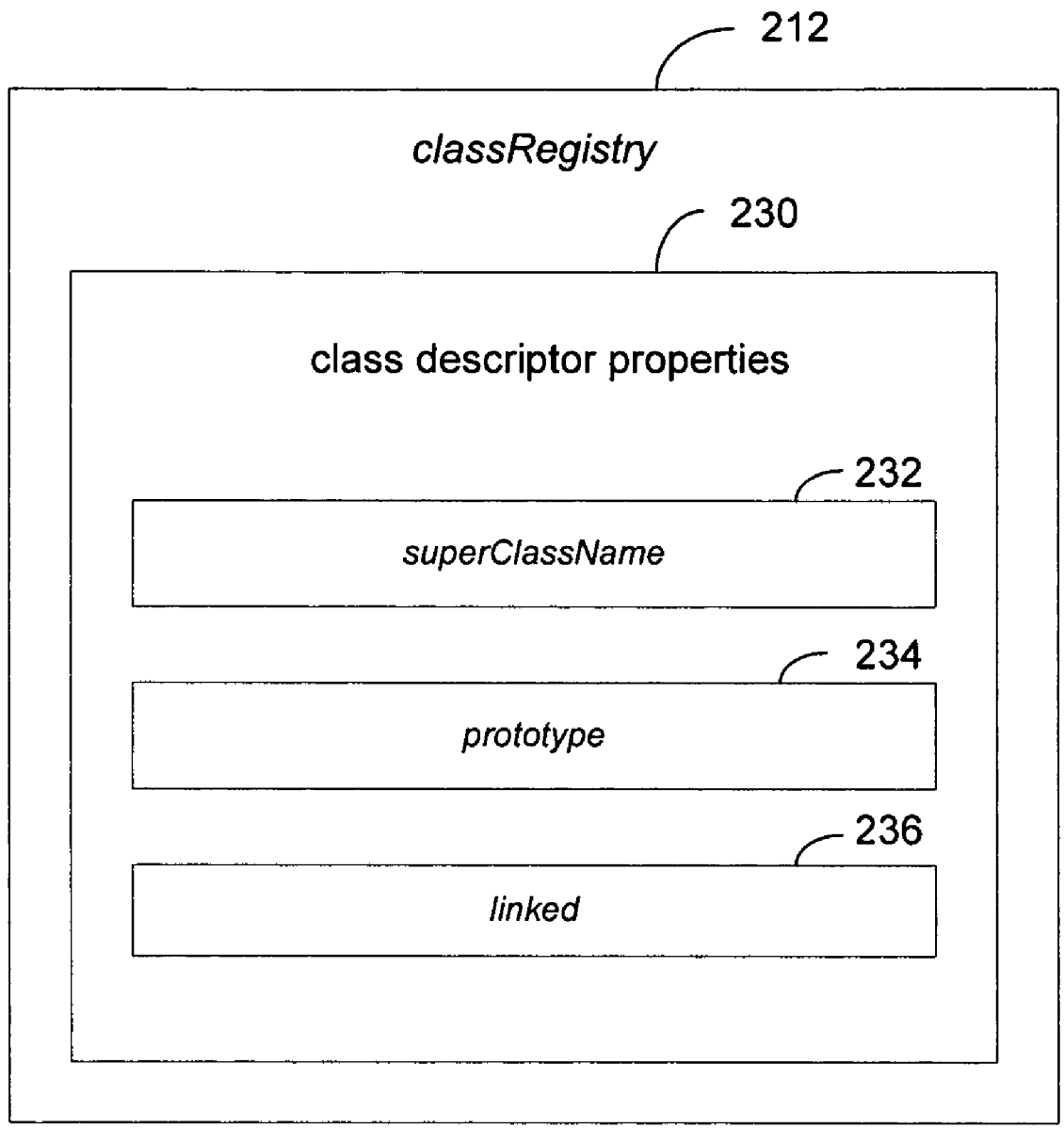
FIG. 4 is a block diagram of a class registry member of the infrastructure class instance.

The member classRegistry 212 is an object that initially has no properties. When component instances 111 are created by calls to the function createInstance(<instance id>, <class name>) 214, the encountered classes are added to the class registry. For each class already encountered, the class registry object has one property, named class name, the name of the encountered class. As shown in FIG. 4, the property value is an object called the class descriptor 230 having a number of properties: a property superClassName 232, a property prototype 234, and a property linked 236. The property superClassName 232 is the name of the classes' super class, and is initially undefined. The property prototype 234 is the prototype of the encountered class, and initially a new object. The property linked 236 has a boolean value and is initially false.

Referring back to FIG. 3, the infrastructure script functions 204 will now be described in greater detail. The function createInstance(<instance id>, <class name>) 214 adds a new property to the instanceRegistry 210 object. The property name is the parameter instance id, and the property value is the parameter class name. Next, createInstance 214 calls internal function loadClass(class name) 215. The function createInstance 214 then returns.

The function registerClass(<class name>) 216 registers the class with name class name. First, registerClass 216 retrieves the class descriptor of the class with name class name from the class registry. There should always be a class descriptor for class class name, when registerClass(<class name>) 216 is called. Next, the function decrements a counter unregisteredClasses by one. Finally, registerClass 216 checks both whether a flag pageComplete is true, and whether a counter unregisteredClasses is zero. If either condition is not satisfied, registerClass 216 returns. Otherwise, registerClass 216 calls a function linkAndCreate 217, which is further described below.

The function deriveClass(<class name>, <super class name>) 218 first retrieves the class descriptor of the class with name class name from the class registry. There should always be an appropriate entry in the class registry. Next, deriveClass 218 sets the value of the superClassName property in the class descriptor to the parameter super class name. The function deriveClass 218 then calls internal function loadClass(super class name) 219 to load the super class in case it is not already loaded. Finally, deriveClass 218 returns the value of the class descriptor's property prototype.

The function run( ) 220 first sets pageComplete to true. Then, it checks whether all classes have already registered. If the value of unregisteredClasses is larger than 0, the function run 220 simply returns. Otherwise, all classes have registered, and run 220 calls function linkAndCreate 217 and thereafter returns.

The function loadClass(<class name>) 215 is an internal function that first checks whether the class name is "Object" (i.e. the built-in root class that does not need to be loaded). If this is the case, loadClass 215 returns. Next, loadClass 215 checks with the class registry whether the class with name class name has already been encountered. If the class registry has a property with name class name, the class has already been encountered, and the function returns. If the class has not already been encountered, function loadClass 215 adds the class to the class registry by creating the class descriptor for class class name.

Referring back to FIG. 4, in the class descriptor 230, property superClassName 232 is set to undefined, property prototype 234 is set to a new object, and the value of property linked 236 is set to false. Additionally, the counter unregisteredClasses is incremented by one. Then, loadClass 215 triggers class loading for class class name. To this end, a script tag is dynamically created with the source being the Uniform Resource Locator (URL) of the component class file for the class with name class name. The URL of the class file can be computed from the information in the HTML page's Document Object Model (DOM) and the parameter class name. Alternatively, rather than getting the server name from the DOM, the server 103 can render the required information into the HTML file. Finally, function loadClass 215 adds the script tag to the HTML page's DOM and returns. Note that adding the script tag to the DOM triggers an asynchronous server request for the class file.

According to one example, a dynamic class model can be organized as follows. Classes are modeled according to prototypes. A class prototype has the same name as the class. The constructor of a class has the same name as the class with the first character of the name being a capital character, and classes are defined in ECMAScript files called class files. The class file for a class with name ClassName has the file name ClassName.js. Class files create a prototype derived from a super class by calling the infrastructure's function deriveClass at the top of the script file. Conceptually, the prototype inherits constants and methods from the super class, and inheritance is transitive. Lastly, class files add constants and methods to the prototype, thus extending the super class or overwriting properties. In one implementation, the inheritance is modeled by first creating objects without properties for the prototype. In a second step, the prototype is later extended by the superclasses' properties.

The following is an example of a class file for a class SampleClass, which is derived from the root class Object, as can be seen in the first non-comment line. Next to the constructor SampleClass( ), the class SampleClass implements only one function, sampleFunction.

```
// ---------------------------------------------------------
// SampleClass.js: Class file for class 'SampleClass'.
// ---------------------------------------------------------
// --- prototype creation by derivation --------------------
SampleClass.prototype = Infrastructure.deriveClass (
       "SampleClass",
       "Object");
// --- constructors ----------------------------------------
function SampleClass( ) {
    // whatever has to be done to create an instance
    return;
}
// --- method section --------------------------------------
SampleClass.prototype.sampleFunction = function(parameter) {
    // whatever happens in this function
    return;
}
// --- end of file -----------------------------------------
```

As discussed above, the function loadClass 215 triggers the server requests for loading class files. The function loadClass 215 adds the dynamically-generated script tag to the DOM of the HTML page, and the client sends an asynchronous request to the server. In contrast to class loading in other languages such as Java or Smalltalk, function loadClass 215 cannot wait for the server response due to the underlying protocol. Rather, the server asynchronously produces its response.

To inform the application infrastructure about the server response at the time the server response arrives, the server adds a class registration statement at the end of the class file, in addition to the contents of the class file. The server can generate the class registration statement from the name of the requested class. The class registration statement calls the function registerClass(<class name>) 216. This mechanism helps the infrastructure 109 decide when class loading has been completed. This decision is important, as application linking and creation cannot commence unless class loading is completed. The following is an example of a class registration statement for class "SampleClass":

```
// --- class registration ---------------------------------
Infrastructure.registerClass ("SampleClass");
// --- end of file ----------------------------------------
```

Figure 5:
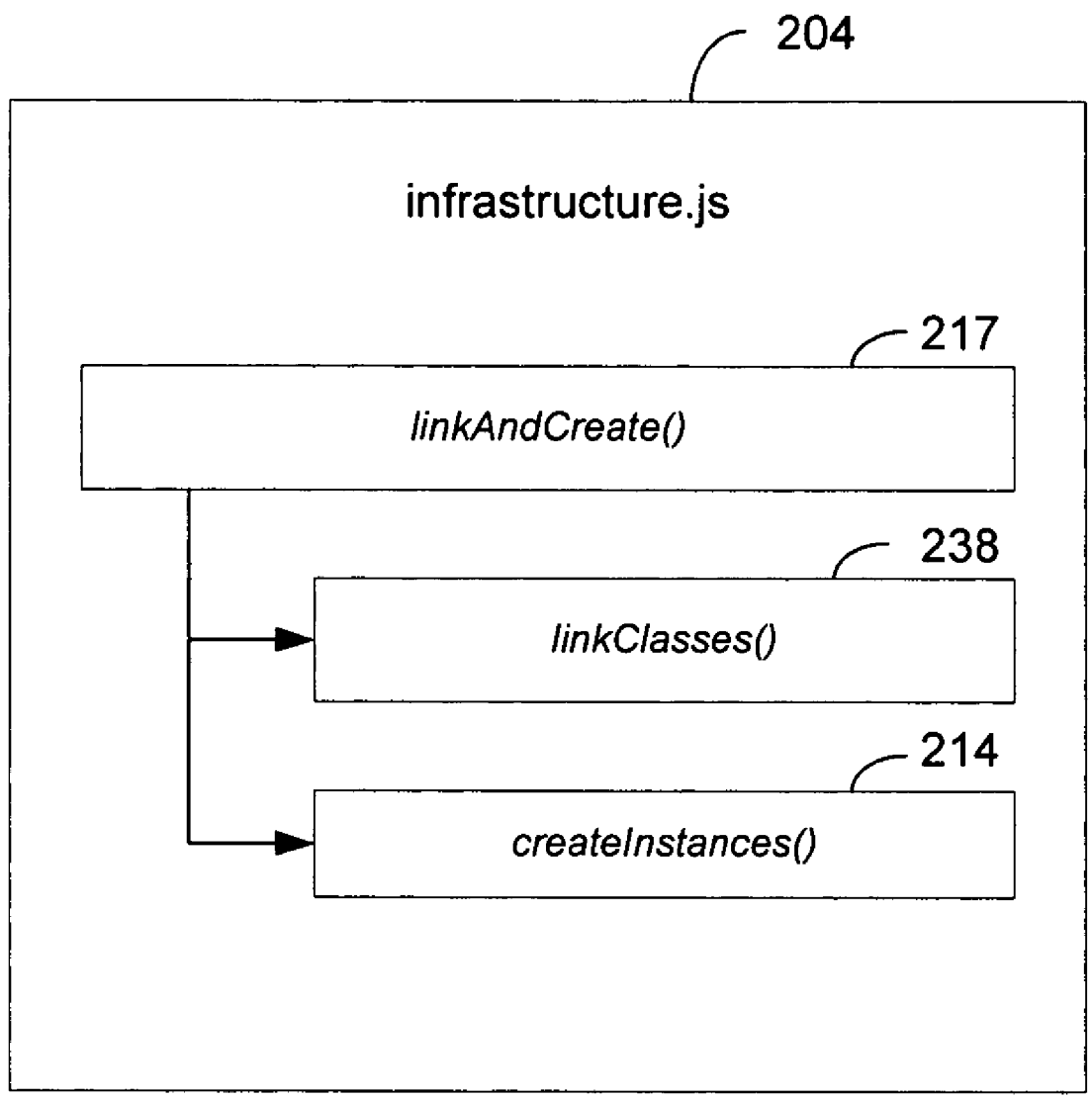
FIG. 5 is a block diagram of an infrastructure class instance showing a link and create function.

Application linking and creation are the final two steps before the application can execute. Both are implemented in function linkAndCreate 217. The linking step completes the class loading process by assembling the prototypes from the class files loaded from the server. The creation step creates the component instances based on the linked classes. As shown in FIG. 5, the function linkAndCreate( ) 217 calls functions linkClasses( ) 238 and createInstances( ) 214 to perform both steps. The function linkClasses( ) 238 runs through the class registry and calls function linkClass for each property class-Name. Recall that the class registry object has one property per encountered class, with the classes name className as the property name, and the classes' class descriptor 230 as its value.

The function linkClass(<class name>) 238 proceeds as follows. First, it checks whether class name is "Object". If so, it returns, as the build-in root class Object requires no linking. Otherwise, it checks whether the class with name class name is already linked, which is the case if the flag linked in the class descriptor is true. If linked is true, the function returns, otherwise linkClass 238 links the super class. To this end, linkClass 238 calls itself recursively with the super class. The super class can be retrieved from the class registry using the super classes' name stored in the class descriptor of the class with name class name. This recursion terminates as every class is derived from class Object, be it directly or indirectly.

Next, the function linkClass 238 assembles the classes' prototype. Thus, it will copy all properties with their values from the super class to the prototype of the class with name class name, unless the class explicitly overwrote the property. This step effectively implements inheritance. All functions and constants the class with name class name implements are already stored at the classes' prototype. By the recursion in the previous step, the classes' super class inherited all functions and constants from their super classes. Copying all functions and constants that have not been explicitly implemented by the class with name class name from the super class prototype to the classes' prototype extends the classes' prototype appropriately. Then, the function sets the flag linked in the class descriptor for the class with name class name to true, and returns.

The function createInstances( ) 214 creates the component instances registered in the component registry. To this end it loops over all entries, there being preferably one entry per call to createInstances 214 in the instance registry. For each entry, createInstances 214 creates the proper component instance by a call to the component constructor. The call to the constructor can be assembled as a string from the class name and a matching pair of parentheses. The constructor can than be triggered using the ECMAScript statement eval(<string>), which evaluates the string as an ECMAScript statement. With the completion of function createInstances 214, the application is ready for execution.

One alternative includes using ECMAScript's build-in prototype mechanism, rather than collecting all constants and functions at a prototype by copying them from the super classes' prototype. Accordingly, to assemble the classes' prototype, the function linkClass 214 proceeds as follows. The function linkClass 214 creates an instance of the super class of the class with name class name. Using ECMAScript's built-in prototype mechanism, the instance is a new object with a prototype link to the super classes' prototype, and as such inherits all properties of the super class. The function linkClass then copies all properties with their values from the classes' prototype to the instance created above. This step extends the super class or overwrites the super classes' methods. Next the property prototype in the class descriptor for the class with name class name are updated with the instance created previously.

Figure 6:
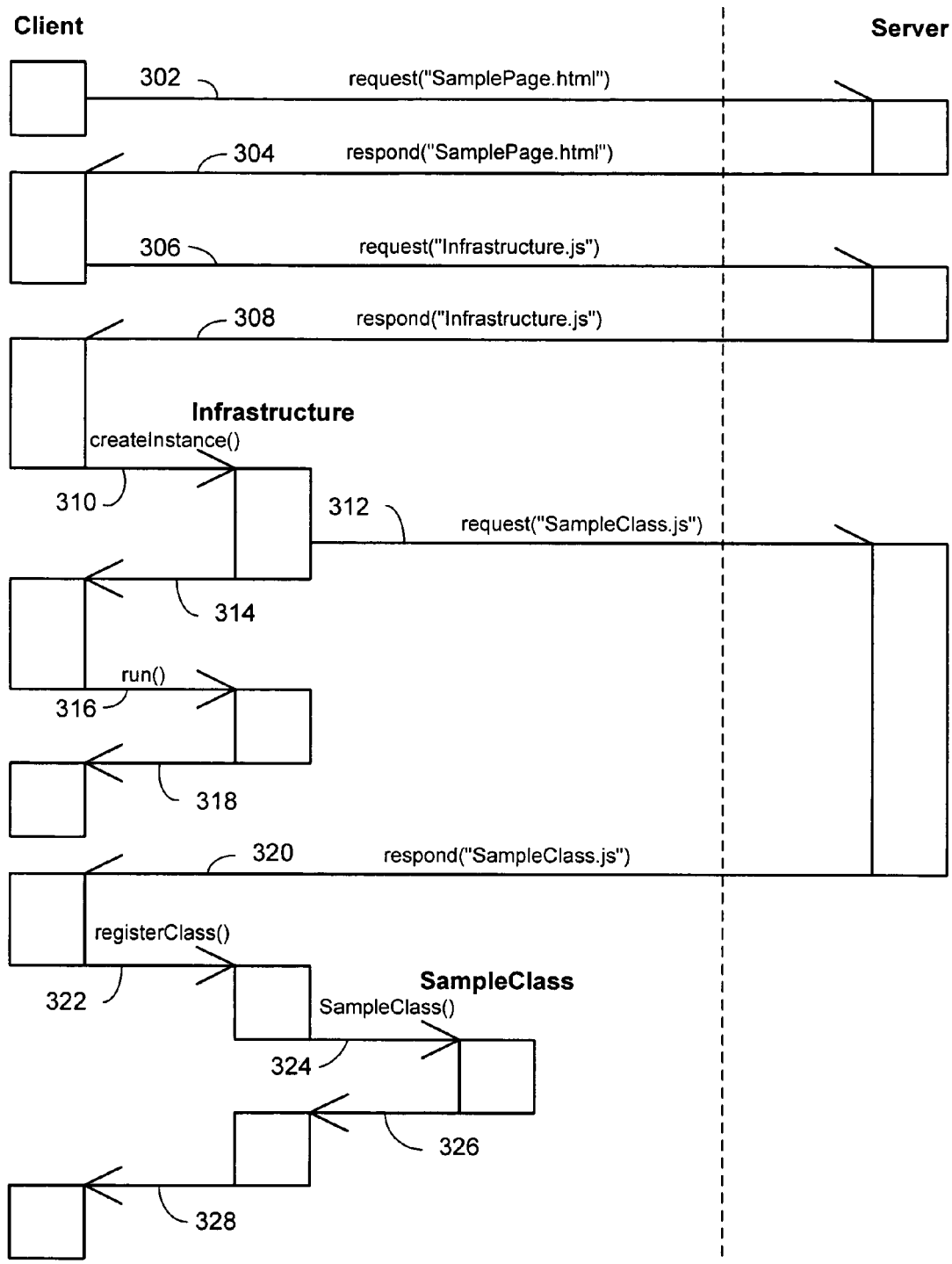
FIG. 6 is a sequence diagram illustrating an execution example of dynamic ECMAScript class loading.

FIG. 6 is a sequence diagram illustrating an execution example of dynamic ECMAScript class loading between a server and a client. As shown in the figure, actions on the left side of the vertical broken line occur on the client side, and actions on the right side of the vertical broken line occur at the server side. A client requests an HTML file "SamplePage.html" at 302. The server returns the file SamplePage.html at 304, and the client proceeds to interpret it. The client then requests the script file infrastructure.js from the server at 306, which returns it at 308. Then, the client loads the infrastructure.js script file. As this script file appears in the header part of the HTML file, other scripts will not be executed before the file infrastructure.js has been completely loaded at the client and executed.

As an effect of executing the infrastructure script file, an instance of the infrastructure is created for requesting and linking all component class script files required for the application. As described above, creating the infrastructure instance has the following additional effects: 1) the four members unregisteredClasses, pageComplete, instanceRegistry, and classRegistry are defined; 2) the member unregisteredClasses is initialized to zero, pageComplete to false, and instanceRegistry and classRegistry to new objects; and 3) functions createInstance, registerClass, deriveClass, and run, as well as internal functions loadClass, linkAndCreate, linkClasses, linkClass, and createInstances are defined.

Next, the body part of the HTML file is executed. The function createInstance is then called at 310 with parameters sampleId and SampleClass. This can include the following effects, not necessarily in the order presented: 1) a property with name sampleId and value SampleClass is added to the instance registry; 2) a property with name SampleClass is added to the class registry. The value of this property is a component descriptor with the following values: property superClassName is set to undefined, property prototype to a new object, and property linked to false; 3) the counter unregisteredClasses is incremented by one; 4) the function createInstance calls function loadClass("Object"), which returns immediately at 314, as no class loading is required for class "Object"; and 5) an asynchronous request for the class file SampleClass.js is sent to the server at 312.

At this point, the execution may proceed in several ways: either the server responds before function run is executed, or after function run is executed. First assume that the client is faster than the server responds, as is shown in FIG. 6. Then, execution proceeds with the call and execution of function run( ) at 318. The function run( ) first sets flag pageComplete to true. Then, as counter unregisteredClasses is not equal to zero, namely one, function run returns at 318.

The asynchronous server response arrives at the client at 320, and the class file "SampleClass.js", as well as the appended class registration statement, are executed. The function deriveClass is called with parameters SampleClass and Object, and updates the class descriptor for class SampleClass, which was created by the call to createInstance at 310 above, with the name of the super class. Then, it returns the new object stored in the prototype property of the class descriptor.

The function SampleClass, the constructor of class SampleClass, is defined. The function sampleFunction is defined and added to the prototype of class SampleClass. The server-generated class registration is executed. Consequently, function registerClass is called at 322 with parameter "SampleClass" at 324. The counter unregisteredClasses is decremented by one, and such becomes zero. As the flag pageComplete was set to true above, and the counter unregisteredClasses already reached zero, and function linkAndCreate is called, before the function exits.

In the case that the server responds before function run is executed, the sequences from 316 to 324 above are executed in the opposite order. Note however, that this time function linkAndCreate is not called by function registerClass, as the flag pageComplete is not yet true. Rather, the function run triggers the call to linkAndCreate, as both conditions are satisfied when run is executed. FIG. 6 shows the request and loading of only a single sample component class. Other component classes can be requested while previously-requested component classes are still being loaded and executed.

The following steps are performed by function linkAndCreate( ), independent of which of the code sequences above is executed. The function linkAndCreate( ) calls function linkClasses( ), which runs through all entries in the class registry. The function linkClasses finds the entry for class SampleClass, and calls function linkClass("SampleClass"). As the class name is not "Object", linkClass checks whether class SampleClass is already linked. This, however, is not the case, as the entry linked in the class descriptor for SampleClass was previously set to false, and not changed since. The function linkClass retrieves the super class name ("Object") from the class descriptor of class SampleClass, and calls itself recursively. This call, however, immediately returns, as class Object requires no linking. Then linkClass copies all properties from the super classes' prototype to the prototype for SampleClass, and sets the flag linked to true and returns at 326.

Finally, function linkAndCreate( ) calls function createInstances( ), which runs through all entries in the instance registry. Using the class name from the instance registry, createInstances can call the constructor of the respective class. Recall that the value of each instance registry entry is the class name of the instance. When all component instances are created, the application can be executed.

The constructor of class SampleClass in Example 2 does not have any parameters. However, it is generally desirable to create instances based on some initialization data. When using the algorithms above to implement, for example, user interface (UI) components, useful constructor parameters are the x and y position of the component, the UI component's width and height, etc.

There are various possibilities to provide the constructor with the initialization data. First, the initialization data can be rendered as an HTML table into the page. The HTML table has the identifier instance id as its unique identifier. Further, the HTML table has two columns, one for a property name, and one for the property's value. createInstance can retrieve the HTML table DOM from the page DOM. createInstance can then parse the HTML table, and extract the properties. With the properties and values, createInstance can generate an ECMAScript object. The ECMAScript object can then be passed to the constructor.

Another way to pass parameters is to render an XML island into the page, rather than an HTML table. The XML island has the following form:

```
<properties>
    <property name="..." value="..."/>
    ...
</properties>
```

In analogy to the HTML table version, createInstance can extract the properties into an ECMAScript object and pass the object to the constructor.

Yet another way is to generate ECMAScript code into the HTML page that creates the parameter object right ahead of the call to createInstance. Rather than passing the instance id, the parameter object is passed and stored in the instance registry. createInstance can again generate a unique identifier for each instance by counting. The property object can then be retrieved from the instance registry in the step above, and passed to the constructor.

A fourth way is to retrieve the data from the server using an asynchronous request similar to the request used to load the class file. This approach is complex and causes one server hit per component instance. Server requests, however, are undesirable, as server requests are slow and consume server resources.

Although a few embodiments have been described in detail above, other modifications are possible. The sequence of processing or execution steps described above do not require the particular order shown or described to achieve desirable results. Other embodiments may be within the scope of the following claims.

The term "computer program product," which can also be referred to as programs, software, software applications, applications, components, code, or the like, includes machine instructions for a programmable processor, and may optionally be implemented in a high-level procedural and/or object-oriented programming language, and/or in assembly/machine language. The term "computer-readable medium" refers to any computer program product, apparatus and/or device, such as for example magnetic discs, optical disks, memory, and Programmable Logic Devices (PLDs), that store machine instructions and/or data that can be provided to a programmable processor.

The invention claimed is:

1. A method for developing a client application in a client-server network, the method comprising:

interpreting a structured code set received from a server at a client that comprises a browser, the structured code set comprising a header and a body and defining a web page in the browser, the header comprising a static reference call to an infrastructure script file at the server and the body comprising a call for at least one component class script that is required for the client application;

loading the infrastructure script file in the browser to create an infrastructure class instance in the browser, creation of the infrastructure class instance being fully completed before the calls in the body of the structured code set are executed by the client, the infrastructure instance comprising a class registry;

executing the body of the structured code set, the executing comprising dynamically generating a script tag corresponding to the call and designating the component class script required for the client application, the executing also comprising registering the component class script and a super class corresponding to the component class script in the class registry;

sending the script tag to the server as an asynchronous request for the component class script designated by the script tag, the sending occurring independently of loading and/or executing of previously requested component classes;

receiving, from the server in response to the asynchronous request, the component class script designated by the script tag, the component class script including a class registration statement from the server that updates the super class in the class registry;

loading the component class script in the browser; and if all of the at least one component class scripts required for the client application have been received from the server:

linking the component class script, the linking comprising assembling a class prototype from the component class script by copying one or more properties and property values from the super class corresponding to the component class script; and creating a component class instance based on the linked component class script.

2. The method in accordance with claim 1, further comprising executing the component instances in the browser to form the application.

3. The method in accordance with claim 1, wherein the class registry is accessible by the infrastructure class instance to link the component class scripts requested from the server.

4. A computer program product for building a client application in a client-server network, comprising a computer-readable medium comprising instructions that, when executed by a server, implement a method comprising:

downloading a structured code set defining a web page from the server to a client to be interpreted in a browser on the client, the structure code set comprising a header and a body, the header comprising a static reference to an infrastructure script file that is stored on the server and the body comprising a call for at least one component class script that is required for the client application; and downloading the infrastructure script file from the server to the client in response to the client executing the static reference in the header, the infrastructure script file creating an infrastructure instance in the browser, the creating of the infrastructure class instance in the browser being fully completed before any further scripts are executed by the client, the infrastructure instance comprising a class registry;

receiving an asynchronous request from the server, the asynchronous request comprising one or more script tags that are dynamically generated by the infrastructure instance to correspond to the component class scripts called in the body of the structured code set, each script tag comprising a uniform resource locator for the corresponding component class script, each asynchronous request occurring independently of loading and/or executing of previously requested component classes in the browser; and sending the requested component class scripts, each of the component class scripts including an additional class registration statement from the server that updates the super class in the class registry at the browser and wherein if all of the at least one component class scripts required for the client application have been received from the server at the browser, the infrastructure instance links the component class scripts and creates a component class instance based on the linked component class scripts, the linking comprising assembling a class prototype from the component class script by copying one or more properties and property values from the super class corresponding to the component class script.

5. The computer program product in accordance with claim 4, wherein the structured code set is HTML.

6. The computer program product in accordance with claim 4, wherein the executable script is compliant with ECMAScript.

7. The computer program product of claim 4, wherein the infrastructure script file defines at least an unregistered classes member, a page complete member, an instance registry member, and a class registry member, the unregistered classes member comprising a counter initially set to zero, the page complete member comprising a Boolean flag initially set to "false," the instance registry member comprising an instance registry object set to register an instance identifier for each class instance to be created, and the class registry comprising a class registry object set to register a class identifier for each component class to be created.

8. A system for developing a client application in a client-server network, the system comprising:

a server that provides:

at least one component class script that is required for the client application;

an infrastructure script file which creates an infrastructure instance when loaded in a browser, the creating of the infrastructure class instance in the browser being fully completed before any further scripts are executed by the client, the infrastructure instance comprising a class registry, and a structured code set comprising a header and a body and defining a web page when interpreted by a browser on a client, the header comprising a static reference to the infrastructure script file, the body comprising a call for at least one component class script that is required for the client application, wherein the browser registers the component class script and a super class corresponding to the component class script in the class registry and dynamically generates at least one script tag corresponding to the call and designating the at least one component class script required for the client application;

wherein the server:

receives an asynchronous request from the client, the asynchronous request comprising the at least one script tag, and sends the at least one component class script to the client, the at least one component class script including an additional class registration statement that updates the super class in the class registry; and wherein the browser:

loads the component class script in the browser, and if all of the at least one component class scripts required for the client application have been received from the server:

links the component class script, the linking comprising assembling a class prototype from the component class script by copying one or more properties and property values from the super class corresponding to the component class script; and creates a component class instance based on the linked component class script.

9. The system in accordance with claim 8, wherein the infrastructure script and each component is compliant with ECMAScript.

10. The system in accordance with claim 8, wherein the web page includes a header having a static reference to the infrastructure script.

11. The system in accordance with claim 8, wherein the web page includes one call to the infrastructure script per component instance.

12. The system in accordance with claim 8, wherein the infrastructure script includes a counter configured to count component class scripts that have not been loaded from the server.

13. The system in accordance with claim 8, wherein the class registry tracks a name of each loaded component class script.

14. The system in accordance with claim 13, wherein the class registry is accessible by code configured to load the required component class scripts from the server.

15. The system in accordance with claim 13, wherein the class registry is accessible by code configured to link the component class scripts at the client.

* * * * *